United States Patent [19]
Bühler et al.

[11] Patent Number: 5,150,956
[45] Date of Patent: Sep. 29, 1992

[54] SAGNAC-TYPE FIBER-OPTIC GYROSCOPE WITH AUXILIARY FIBER COIL

[75] Inventors: Wolfhardt Bühler, Munich; Hans Poisel, Dachau; Gert Trommer, Munich, all of Fed. Rep. of Germany

[73] Assignee: Messerschmitt-Bölkow-Blohm GmbH, Fed. Rep. of Germany

[21] Appl. No.: 564,751

[22] Filed: Aug. 9, 1990

[30] Foreign Application Priority Data

Aug. 9, 1989 [DE] Fed. Rep. of Germany ....... 3926312

[51] Int. Cl.⁵ ............................................ G01C 19/72
[52] U.S. Cl. .................................................. 356/350
[58] Field of Search ............................. 356/350, 345; 350/96.15; 250/227.27

[56] References Cited

U.S. PATENT DOCUMENTS

| | | | |
|---|---|---|---|
| 4,283,144 | 8/1981 | McLandrich | 356/350 |
| 4,573,797 | 3/1986 | Burns | 356/350 |
| 4,639,138 | 1/1987 | Martin et al. | 356/350 |
| 4,707,062 | 11/1987 | Abe et al. | 350/96.16 |
| 4,822,128 | 4/1989 | Imoto et al. | 350/96.15 |

Primary Examiner—Samuel A. Turner
Assistant Examiner—Richard E. Kurtz, Jr.
Attorney, Agent, or Firm—Evenson, Wands, Edwards, Lenahan & McKeown

[57] ABSTRACT

A Sagnac-type fiber-optic gyroscope having a light source, a fiber coil consisting of an optical fiber, and a receiver arrangement which are all connected with a directional coupler in such a manner that wide-band light of the light source is fed into the two ends of the fiber coil and passes through it in opposite directions, the light emerging from the ends of the fiber coil and forming an interference signal in the directional coupler which is detected. An auxiliary coil is also connected with the directional coupler into which light from the single light source is also coupled, the dimensions of the auxiliary coil and of the main coil with respect to their length and their diameter being such that a measuring range is obtained that is expanded by the auxiliary coil and in which, for the whole measuring range, unambiguous measuring values may be determined for the rate of rotation of the fiber-optic gyroscope.

5 Claims, 2 Drawing Sheets

SAGNAC-TYPE FIBER-OPTIC GYROSCOPE WITH AUXILIARY FIBER COIL

BACKGROUND AND SUMMARY OF THE INVENTION

The present invention relates to an improved optic-fiber gyroscope of the type in which the Sagnac effect is utilized. In such gyroscopes, light from a single light source, normally by means of a directional coupler, is fed into the two ends of a fiber coil from a fiber-optic light guide so that the light passes through the light guide clockwise and counterclockwise. The light fractions emerging from the ends of the fiber coil interfere with one another in the coupling area of the directional coupler, whereby phase differences are transformed into amplitude differences. The resulting interference signal is received by means of a receiver arrangement. The output signals of the receivers are dependent on the Sagnac phase which, in turn, is directly proportional to the rate of rotation of the fiber-optic gyroscope so that the rate of rotation of the fiber-optic gyroscope can be determined directly from the output signals of the receivers.

An example of this type of an optic-fiber gyroscope is disclosed in the U.S. Pat. No. 4,440,498, in which a sixgate coupler, generally referred to as 3×3 coupler, is used. The directional coupler is produced, for example, by the melting-together of three monomode fibers so that three inputs/outputs respectively are created on both sides of the melting area which forms the coupling area. The light of the light source, which preferably is unpolarized and has a wide-band frequency, is fed to a gate of the directional coupler and, in the coupling area, is uniformly distributed to two gates on the other side of the directional coupler to each of which one end respectively of the fiber coil is connected. The interference light is guided to two gates on the side of the light source, which are situated symmetrically with respect to the gate connected with the light source and to which the one respective receiving diode is connected. The sixth gate of the directional coupler on the side of the fiber coil may, for example, be connected to a monitoring circuit by means of which the time variation of the light intensity of the light source is measured and is taken into account during the determination of the rate of rotation.

In this case, the output signals of the receiving diodes depend on a linear combination of sine and cosine of the Sagnac phase and are therefore periodic. An unambiguous determination of the rate of rotation is therefore possible only if the magnitude of the Sagnac phase is smaller than 180°.

The Sagnac phase, in turn, is proportionally dependent on the product of the fiber radius and the fiber length of the light guide, so that correspondingly the rate of rotation is also a function of this product.

If low rates of rotation are to be measured, a high value will be selected for this product in order to obtain a high sensitivity of the fiber-optic gyroscope. Because of the mentioned periodicity of the output signals of the receiving diodes, the measuring range of the fiber-optic gyroscope in which unambiguous measuring values are obtained therefore becomes correspondingly small.

If, on the other hand, high rates of rotation are to be measured, i.e., the "unambiguous" measuring range of the fiber-optic gyroscope is to be expanded, a lower value will be selected for the product of the fiber radius and the fiber length. The consequence will then naturally be that the sensitivity of the fiber-optic gyroscope is correspondingly lower for low rates of rotation.

It is an object of the present invention to provide a fiber-optic gyroscope of the above-mentioned type wherein the measuring range, in which unambiguous values are obtained for the rate of rotation, is expanded so that high rates of rotation can also be measured while at the same time, a high sensitivity exists for low rates of rotation.

According to the invention this object is achieved by providing in addition to a fiber coil for the determination of low rates of rotation, a second auxiliary coil into which light is coupled from the same light source and which, in comparison to the main coil, has a different length and/or a different fiber radius. The latter parameters for the auxiliary coil are selected such that the measured output values are unambiguous over the entire rate of rotation range to be detected, up to the maximal rate of rotation. By means of the two fiber coils, different "unambiguous" measuring ranges are therefore covered.

Since variation of the fiber radius is possible only to a limited extent, the teaching of the invention is essentially that the main coil and the auxiliary coil have different lengths.

According to a preferred embodiment of the invention, a 4×4 coupler is used for the fiber-optic gyroscope which, on both sides of its coupling area, has four optical gates. The main and auxiliary coils are connected with two gates respectively on one side of the directional coupler, while on the other side one gate is connected with the light source, and the other gates are each connected with separate receivers. Only two receivers at two gates are required for an unambiguous measurement; the signal of the third receiver may be used to increase the measuring precision or for control purposes.

Other objects, advantages and novel features of the present invention will become apparent from the following detailed description of the invention when considered in conjunction with the accompanying drawings.

DETAILED DESCRIPTION OF THE DRAWINGS

Figure 1:
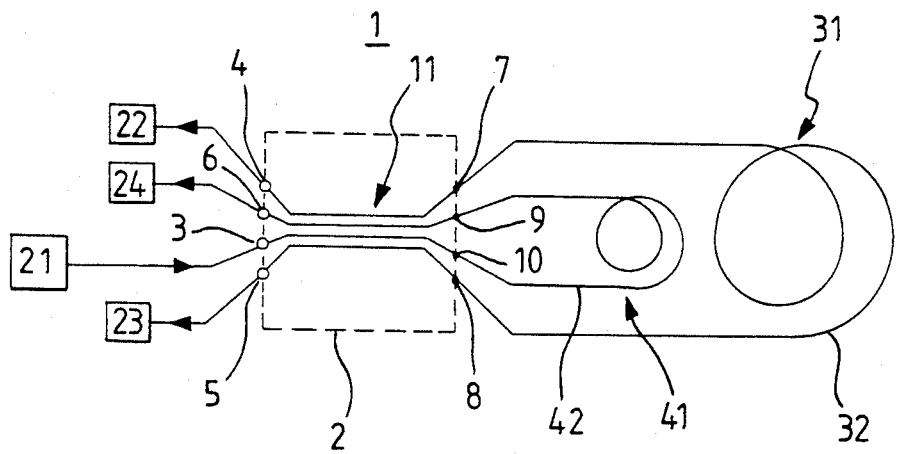
FIG. 1 is a schematic representation of a fiber-optic gyroscope according to the invention.

As depicted in FIG. 1, a fiber-optic gyroscope 1 has a 4×4 directional coupler 2 which, on its two sides, has four gates 3, 4, 5, 6, and 7, 8, 9, 10 respectively, which are connected with one another by way of a coupling area 11 of the directional coupler 2. A light source 21 and three receiving diodes 22, 23 and 24 are connected with gates 3, 4, 5 and 6. Gates 4 and 5 for the two receiving diodes 22 and 23 are situated on opposite sides of gate 3 connected with the light source 21, whereas gate 6 for the third receiving diode 24 is situated between gates 3 and 4.

The light source 21 emits preferably unpolarized light in a wide-band frequency range. In the coupling area 11, this light is uniformly distributed to the two gates 7 and 8 with which the two ends of a main coil 31 of a long monomode optical fiber 32 are connected so that the split-up light fractions pass through the main coil 31 in opposite directions. The light passing through the main coil 31, through gates 7 and 8, enters the light coupler 2 again and interferes in the coupling area 11. The interference signal is guided to the receiving diodes 22, 23 and 24, from the output signals of which the rate of rotation of the fiber-optic gyroscope is determined.

In this case, the length and the diameter of the optical fiber 32 is dimensioned to be such that the fiber-optic gyroscope has a high sensitivity with respect to low rates of rotation.

Another part of the light guided to the directional coupler 2 by way of gate 3 is fed through gates 9 and 10 to a second fiber-optic coil 41 consisting of optical fiber 42, which is referred to herein as an auxiliary coil. Starting from gates 9 and 10, the light passes through this auxiliary coil 41 also in opposite directions and interferes in the coupling area 11, this interference light being registered by the same receiving diodes 22, 23 and 24. The auxiliary coil 41 is preferably wound from a monomode fiber of a short length and/or a small diameter. These dimensions are selected such that the Sagnac phase arising in the auxiliary coil, even in the case of a maximally provided high rate of rotation, has a phase angle smaller than $\pm 180°$. Thus the measuring signal remains unambiguous in the provided measuring range. The signals generated by the auxiliary coil 41 are combined with the output signals from coil 31 because both fiber coils 31 and 41 have the receiving diodes in common. Because of the different fiber lengths and/or fiber radii of the two coils, and because of the short coherence length of the wide-band light source 21, the signals of the main and auxiliary coils 31 and 41 interfere separately from one another. The output signal at the receiving diodes 22, 23 and 24 therefore consists of the sum of the intensities which result individually from the separate interference or Sagnac signals of the two coils.

Figure 2:
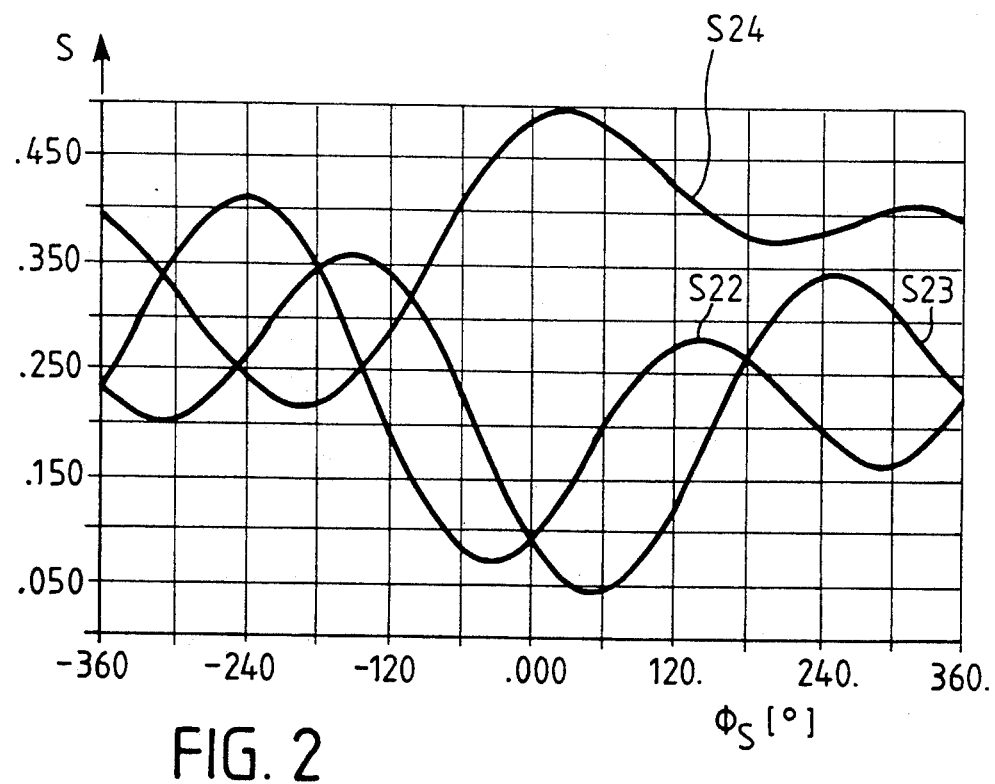
FIG. 2 is a signal diagram of the receiving signals.

In FIG. 2, the output signals $S_{22}$, $S_{23}$ and $S_{24}$ of the diodes 22, 23 and 24 are entered as a function of the Sagnac phase. In this case, the product of the fiber radius and the fiber length of the auxiliary coils 41 was half the size of that of the main coil 31, and the 4×4 coupler had coupling constants $K_{ij}$ with a coupling length L which permit an operation close to the quadrature point. Also, the individual coupling constants were selected as follows, in which case, by means of indices i and j, the respective reference symbols were used for the gates of the light coupler:

$$K_{37}L = K_{38}L = K_{67}L = K_{68} = K_{48}L = pi/6$$

$$K_{33}L = pi/12$$

FIG. 2 illustrates that the combined signals of the receiving diodes 22 and 23 are not ambiguous any point in the whole measuring range between $\pm 360°$. The output signal $S_{24}$ of the receiving diode 24 may be analyzed in order to increase the measuring precision or for control purposes.

Figure 3:
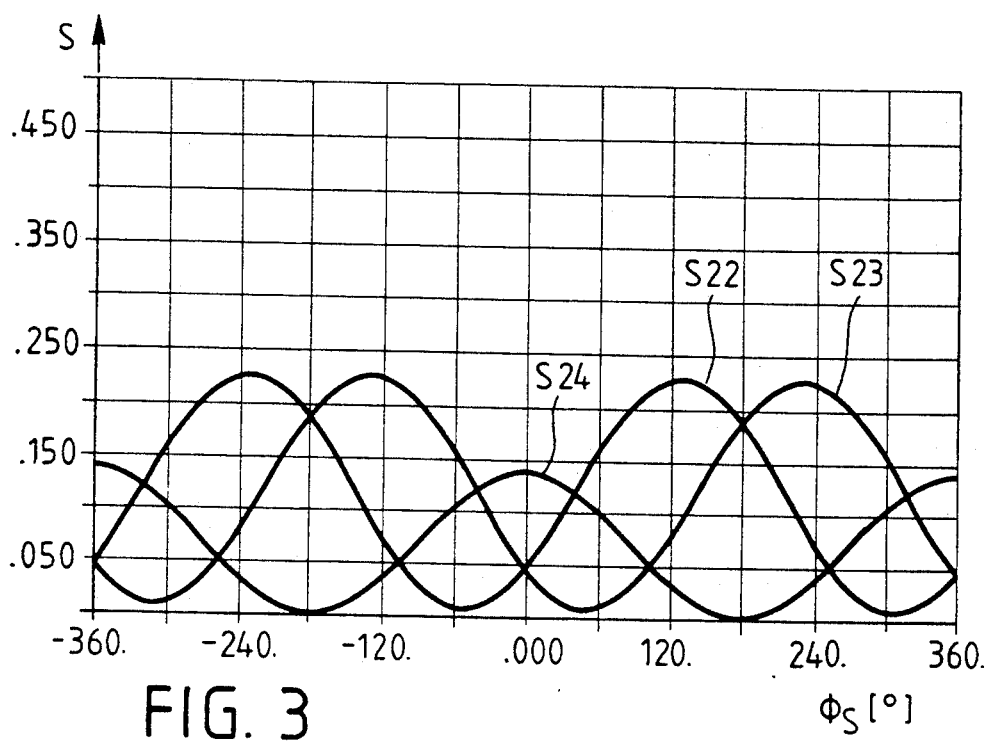
FIG. 3 is a signal diagram of the receiving signals of a fiber-optic gyroscope in which the main coil is not shown.
Figure 4:
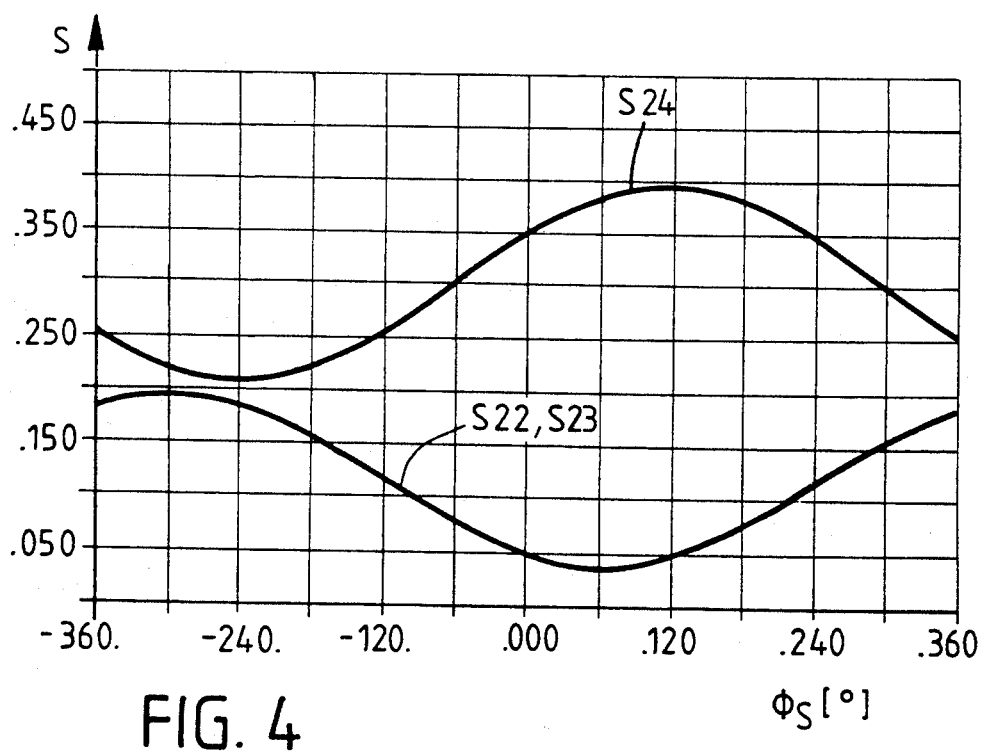
FIG. 4 is a signal diagram of the receiving signals in which the auxiliary coil is not shown.

FIGS. 3 and 4 illustrate the output signals $S_{22}$, $S_{23}$ and $S_{24}$ of the receiving diodes 22, 23, and 24 for a fiber-optic gyroscope without a main coil 31, and without an auxiliary coil 41, respectively. Comparison of these signals with the signal diagram in FIG. 2, demonstrates that the measuring range up to $\pm 180°$ of the Sagnac phase furnishes unambiguous measuring values only by means of a combination of two fiber coils.

In the signal diagrams according to FIG. 2 to 4, the scale factor of the auxiliary coil, i.e., the product of the fiber radius and the fiber length, was $\frac{1}{2}$ of the scale factor of the main coil. In order to achieve an increase of the unambiguous measuring range also in the case of Sagnac angles, which amount to an integral multiple (n-times) of the phase angle of 180°, the scale factor of the auxiliary coil is determined to the nth part of the main coil. The output signals $P_i$ of the receiving diodes 22, 23 and 24 will then depend on the Sagnac phase $Phi_s$ of the main coil, corresponding to:

$$P_i = a_i + b_i \cos(Phi_s c_i) + d_i \cos(Phi_s/n + e_i)$$

with i=1, 2, 3, in which case coefficient 1 is assigned to receiving diode 22, coefficient 2 is assigned to receiving diode 23, and coefficient 3 is assigned to receiving diode 24. Coefficients $a_i$, $b_i$, $c_i$, $d_i$ and $e_i$ depend on the above-mentioned coupling constants $K_{ij}$ of the (4×4)-coupler. The functional dependence $Phi_{s/n}$ which ensures the unambiguousness in the angle ranges of 180° which are each multiplied by n is important In the preceding, it was mentioned that the directional coupler has a coupling area which is produced by the melting of optical fibers. Naturally, other constructions of directional couplers are also possible. As an example, reference is made to the U.S. Pat. No. 4/707,062 and German Patent Document DE-OS 2 938 526.

Although the invention has been described and illustrated in detail, it is to be clearly understood that the same is by way of illustration and example, and is not to be taken by way of limitation. The spirit and scope of the present invention are to be limited only by the terms of the appended claims.

We claim:
1. A fiber optic gyroscope comprising:
   a light source emitting continuous light having a wide-band frequency range;
   a main fiber coil comprising an optical fiber having two ends;
   at least one auxiliary fiber coil comprising an optical fiber having two ends and having a length and radius the product of which is smaller than that of the main fiber coil;
   said light source being optically coupled to said main fiber coil and said auxiliary fiber coil by a 4×4 directional coupler whereby light from said light source is fed into both ends of the optical fibers and is transmitted in mutually opposite directions in each of the respective main and auxiliary fiber coils;
   means for combining light emitted from the ends of the fiber in said main coil to generate a first interference signal which is responsive to a speed of rotation of said gyroscope, and for combining the light emitted from the ends of the fiber in the auxiliary coil to generate a second interference signal which is responsive to a speed of rotation of said gyroscope;
   means for combining said first and second interference signals to produce a third interference signal which is equal to the sum of the first and second interference signals;

and light detector means coupled to at least two gates of said 4×4 coupler means for detecting said third interference signal.

2. The apparatus according to claim 1, wherein said 4×4 directional coupler comprises four monomode fibers melted together in the coupling area.

3. A fiber-optic gyroscope comprising:
a source of continuous light having a wide-band frequency range;
a main fiber coil comprising of an optical fiber having two ends;
at least one auxiliary fiber coil comprising an optical fiber having two ends and having a length and radius the product of which is smaller than that of the main fiber coil;
a 4×4 directional coupler having a coupling area, four first gates on a first end of said coupling area and four second gates on a second end of said coupling area;
a light source being connected to at least one of said first gates, and said main fiber coil and auxiliary fiber coil being connected to said second gates in such a manner that light from said light source is fed into both of the two ends of each of the respective main and auxiliary fibers coils and passes through each of said fiber coils in opposite directions, light emitted from the respective ends of said fiber coils being combined in the directional coupler to form an interference signal which is equal to the sum of signals generated by interference of light emitted from the ends of said main coil and said auxiliary coil respectively; and
light detectors coupled to receive light emitted by each of at least two of said first gates, whereby signals from said detectors provide an unambiguous indication of a rotation speed of said main and auxiliary fibers in an entire measurement range of said fiber optic gyroscope.

4. The apparatus according to claim 3, comprising three light detectors, each of which is separately connected with the directional coupler through a separate one of said first gates.

5. The apparatus according to claim 3, wherein the product of the length and radius of the optical fiber of the main coil is an integral multiple of the corresponding product of the optical fiber of the auxiliary coil.

* * * * *